United States Patent
Descombes et al.

(10) Patent No.: US 11,956,325 B2
(45) Date of Patent: Apr. 9, 2024

(54) LOCATION-BASED PUBLICATION OVER A CELLULAR NETWORK

(71) Applicant: Vodafone Automotive S.p.A., Varese (IT)

(72) Inventors: Jean-Luc Descombes, Varese (IT); Luca Ceva, Varese (IT); Paolo Giuseppetti, Varese (IT)

(73) Assignee: Vodafone Automotive S.p.A. (IT)

( * ) Notice: Subject to any disclaimer, the term of this patent is extended or adjusted under 35 U.S.C. 154(b) by 182 days.

(21) Appl. No.: 17/497,078

(22) Filed: Oct. 8, 2021

(65) Prior Publication Data

US 2022/0116465 A1 Apr. 14, 2022

(30) Foreign Application Priority Data

Oct. 9, 2020 (IT) .................. 102020000023833

(51) Int. Cl.
*H04L 67/52* (2022.01)
*H04L 67/55* (2022.01)
*H04W 4/02* (2018.01)

(52) U.S. Cl.
CPC .............. *H04L 67/52* (2022.05); *H04L 67/55* (2022.05); *H04W 4/026* (2013.01); *H04W 4/027* (2013.01)

(58) Field of Classification Search
CPC ........ H04L 67/52; H04L 67/55; H04W 4/026; H04W 4/027
See application file for complete search history.

(56) References Cited

U.S. PATENT DOCUMENTS

| | | | | |
|---|---|---|---|---|
| 10,938,768 | B1* | 3/2021 | Krishnamurthy | H04L 51/52 |
| 2010/0291907 | A1* | 11/2010 | MacNaughtan | H04L 67/53 463/41 |
| 2011/0138064 | A1* | 6/2011 | Rieger | G06F 16/9577 707/715 |
| 2012/0050033 | A1* | 3/2012 | Westen | G01S 5/0027 340/539.13 |
| 2013/0276035 | A1* | 10/2013 | Walker | H04N 21/8456 725/62 |
| 2014/0222339 | A1* | 8/2014 | Abhyanker | G01C 21/3837 726/28 |

(Continued)

OTHER PUBLICATIONS

Ibrahim, "Is geocasting the next step in cellular VX comminication?", May 1, 2020, accessed on Oct. 8, 2021 via URL: https://www.ericsson.com/en/blog/2020/5/geocasting-cellular-v2x-communication, 11 pages.

(Continued)

*Primary Examiner* — Ernest G Tacsik
(74) *Attorney, Agent, or Firm* — WORKMAN NYDEGGER

(57) ABSTRACT

A client device for use in a cellular network providing location-based publications using a publish/subscribe protocol. The client device determines a geographical location relevant to the client device, determines a subscription geohash, to identify an area including the geographical location relevant to the client device, and sends a subscription to a server, the subscription having a subscription name comprising the subscription geohash. Also described are a server and a method for use in a cellular network providing location-based publications using a publish/subscribe protocol.

18 Claims, 10 Drawing Sheets

---

Determine a geographical location relevant to a client device — 510

Determine a subscription geohash, to identify an area including the geographical location relevant to the client device — 520

Send a subscription to a server, the server having a subscription name comprising the subscription geohash — 530

(56) References Cited

U.S. PATENT DOCUMENTS

| | | | |
|---|---|---|---|
| 2015/0215409 A1* | 7/2015 | Chow | H04W 4/021 455/456.3 |
| 2016/0119748 A1* | 4/2016 | Li | H04L 67/55 455/456.3 |
| 2016/0165407 A1 | 6/2016 | Cuomo et al. | |
| 2019/0261161 A1* | 8/2019 | Cardoso | H04W 4/38 |
| 2019/0289089 A1* | 9/2019 | Huang | H04L 67/55 |
| 2019/0297474 A1* | 9/2019 | Orsini | H04W 4/021 |
| 2020/0258328 A1* | 8/2020 | Gawthorpe | G01C 21/32 |
| 2021/0092551 A1* | 3/2021 | Millington | H04W 4/029 |
| 2021/0306280 A1* | 9/2021 | Dorofiyenko | G06Q 50/30 |
| 2022/0300537 A1* | 9/2022 | Song | G06F 16/24556 |

OTHER PUBLICATIONS

Search Report for Italian Patent Application No. 2020000023833 dated Jun. 4, 2021.

\* cited by examiner

FIGURE 11

LOCATION-BASED PUBLICATION OVER A CELLULAR NETWORK

CROSS-REFERENCE TO RELATED APPLICATIONS

The present application claims the benefit of and priority to Italian patent application no. 102020000023833, filed Oct. 9, 2020, the disclosure of which is incorporated herein by reference in its entirety.

BACKGROUND OF THE INVENTION

1. Field of the Invention

A method and system for use in a cellular network providing location-based publications using a publish/subscribe protocol. The method and system uses a geohash within the topic for each subscription and publication, in order to deliver geographically relevant messages to subscribers.

As mobile and data connected devices grow in prevalence, the need for efficient and effective geocasting of messages increases. Geocasting describes the delivery of information or messages to one or more destinations in a network, based on that have an interest in a particular geographical location. Geocasting may be desired in various applications, including provision of safety alerts relating to a specific geographical area (flood or earthquake alerts, for instance), provision of local information (including weather or commerce), or in relation to transport (road traffic congestion alerts, or transport disruption, for instance). In a particular example, application of geocasting may be particularly useful within in the emerging era of autonomous vehicles (and the new services that will accompany this technological revolution), and in which communication between geographically local vehicles or between vehicles and infrastructure on the basis of a relevant location is a key element. Due to the nature of such applications however, the most relevant geographical area local to a user may change regularly.

2. Description of Related Art

Prior art methods provide various solutions for location-based messaging. For instance, a solution relating to 'nodes and ways' (https://www.ericsson.com/en/blog/2020/5/geocasting-cellular-v2x-communication, accessed 23 Jun. 2020) can deliver messages to users located in a specific road segment and travelling in a specific direction. However, the solution requires complex infrastructure (in relation to the application server, application programming interfaces (APIs), computing regions of interest, maps etc.) with the messages needing to be processed by the application server, which would increase cost and time for introduction of such a service.

Other proposals make use of a publish/subscribe model for sending messages. For instance, European Patent Publication No. EP2893675 describes a system and method in which a subscription is received at a server, together with a subscription centre location and a radius for receiving publications. The server translates this received area into a geohash. The server further receives a publication including a publication location, and then uses the geohash determined with respect to the subscription to identify subscribers to receive the publication, based on whether the publication location is in the geographical area represented by the geohash. However, this requires customisation of the application server and, in view of the role of the application server, can be difficult to scale so as to geocast large numbers of different messages to individual users. A similar solution is described in US Patent Publication No. US 2016/165407.

An ideal system for geocasting of messages will be straightforward to implement and scale within a cellular network. Moreover, the system will be efficient, only send messages to user devices to which they are relevant, and should be able to route messages without parsing them. However, the system will potentially be able to support the multicasting of a large number of messages to multiple users. Thus, the presently described invention looks to solve these drawbacks.

BRIEF SUMMARY OF THE INVENTION

There is described herein a client device and server forming part of a system (and to be used within a method) for subscribing to and publishing location-based publications over a cellular network. In particular, there is a client device for subscribing to location-based publications, and a server for receiving and managing subscriptions, and for sending publications to matching subscribers. The method and system associates subscribers with publications by matching a subscription name with a publication name. Each of the subscription name and the publication name comprise a geohash, in some cases of different length, which can be compared so as to identify whether a publication relates to the geographical area indicated in a subscription. The client device may compute directly the geohash for a geographical area relevant to its user, for subsequent use in one or more subscriptions. In some cases, the subscription geohash (and certain of its characteristics) are determined based on the speed and direction of motion of the client device.

In a first aspect, there is described a client device for use in a cellular network providing location-based publications using a publish/subscribe protocol, comprising at least one processor and at least one memory storing program code instructions, wherein execution of the program code instructions at the processor cause the client device to:

determine a geographical location relevant to the client device;

determine a subscription geohash, to identify an area including the geographical location relevant to the client device;

send a subscription to a server, the subscription having a subscription name comprising the subscription geohash.

A client device may be any device suitable for hosting a client of a publish/subscribe messaging protocol. The client device may be a mobile device or user equipment, for example. More specifically, the client device may be a mobile telephone or laptop, or may form part of a control system for another instrument (such as a vehicle). Although the client device may be mobile (for instance, designed to be easily moved or transported by a user to different locations), the client device could also be fixed or not specifically designed to be easily and frequently moved (such as a desktop personal computer).

Location-based publications describe messages that are sent to one or more client devices based on a location or geographical position associated with the device. Location-based publication can also be known as geocasting, which describes the delivery of information to a destination or group of destinations in a network, identified by their geographical locations. For instance, a first message may be sent to a first set of users associated with a first geographical location, and a second message may be sent to a second set of users associated with a second, different geographical location. Some, or even all, of the first and second set of users may be the same, or may be different.

Publish/subscribe protocol (or publish/subscribe messaging or publish/subscribe pattern) is a messaging paradigm where senders of messages, called publishers, do not program the messages to be sent directly to specific receivers, called subscribers. Instead they categorise published messages into classes, without knowledge of which subscribers, if any, there may be. Similarly, subscribers express interest in one or more classes and only receive messages that are of interest, without knowledge of which publishers, if any, there are. As such, each subscription and publication identifies a class (or topic), and upon association of the class (or topic) in the publication with that in a subscription, the message and subscription are matched. Examples of publish/subscribe protocols include Message Queuing Telemetry Transport (MQTT) and Advanced Message Queuing Protocol (AMQP).

A geographical location relevant to the client device may be determined via any location information sent, received or generated at the client device. In particular, the geographical location relevant to the client device may be the geographical location of the client device (for example, identified by a navigation or positioning system within the device, or input by the user, or received from a measurement at other elements of the system). However, the geographical location relevant to the client device could also be another geographical location of interest to a user of the client device, and input to the client device though any other means. For example, the client device could be a mobile device, and the geographical location relevant to the client device may be a user's home address (as input by the user, or communicated from navigation applications elsewhere in the device). Even if the geographical location relevant to the client device is not the current position of the mobile device, it may be a location for which the user of the device wishes to receive messages or alerts that are published.

In the described example, the subscription sent by the client device includes a subscription name, which identifies the class or topic for the subscription. The subscription name comprises a geohash, here labelled the subscription geohash. The geohash is a string of alphanumerical characters that can identify a location to potentially limitless precision (dependent on the length of the geohash). The subscription geohash used within the subscription name is computed by the client device to represent an area in which the geographical location relevant to the client device is situated. The subscription geohash may be computed at the client device using various publically available libraries.

Advantageously, the present invention forms part of a system for location based-messaging that is highly scalable (as the processing for identification of the geohash subsequently used for location-based messaging is implemented at the client device) and that is efficient. Moreover, the use of a geohash directly within the subscription class or topic allows for reliance on existing publish/subscribe protocol techniques, without requirement for complex customisation or implementation of additional calculations at the server.

Beneficially, in the present invention messages do not need to go through processing or to be parsed in order to be routed. Therefore, the described solution offers very low latency, especially compared to some known systems. This provides particular advantages in applications such as autonomous or self-driving cars, where reducing end-to-end communication delay is especially important. Additionally, the apparent minimalism of the proposed solution allows it to be easily deployed in Multi-access Edge Computing (MEC) application servers, to further reduce latency. Overall, the combination of the present invention with MEC and 5G technologies provides an approach that optimises latency times, which is a significant prerequisite for advancing and improving technologies in various sectors.

Preferably, the subscription geohash is a hierarchical data structure specified to a subscription level. As will be understood by the skilled person, the geohash is an alphanumerical string, which may include (or be specified to) any number of characters. Each additional character of the geohash denotes a further subdivision of a larger geographical area. Therefore, a shorter geohash (with fewer characters, or specified to a higher level in the hierarchical structure) represents a larger geographical area than a longer geohash string (with more characters, or specified to a lower level in the hierarchical structure). As such, each additional character within the geohash may be considered as the geohash being specified to an additional (lower) level of the hierarchical data structure. The specification level to which a subscription geohash is specified denotes the total number of characters within the subscription geohash.

Preferably, execution of the program code instructions at the processor further cause the client device to:
 determine a speed of the client device; and
 determine the subscription level based on the speed.

In other words, the level to which the geohash is specified (and so the precision to which the geographical location relevant to the client device is identified in the subscription name) is related to the speed of the client device. The speed of the client device may be a measured instantaneous speed or an average speed, or may be a parameter received at the device (for example, from a measurement at another element of the system). The specification level may be determined from the speed by way of a predefined relationship.

For example, a speed may be determined to be within predetermined ranges, with each range associated with a different specification level. In a particular example, a speed within a range of lower speeds may be associated with a relatively lower subscription level (so have more characters within the geohash), compared to a speed within a range of higher speeds which may be associated with a relatively higher subscription level (so have relatively fewer characters within the geohash).

Advantageously, this means that a client device moving at higher speed (and so travelling a greater distance within a certain time) may be subscribed to publications related to a relatively larger area than a client device moving at relatively lower speed (and so travelling a smaller distance within the same amount of time).

Preferably, the client device being directed to determine a subscription geohash further comprises the client device being directed to determine a subscription geohash specified to the subscription level, and wherein the subscription name includes a predefined number of characters, wherein any characters of the predefined number of characters that are not filled by the subscription geohash specified to the subscription level are filled with a wildcard character.

In other words, the subscription geohash is specified to a given length (the "subscription level"). However, the class or topic string required within a subscription may be of a predefined length, that can be different to (in particular, longer than) the subscription geohash. In this case, any characters within the class or topic string that exceed the number of characters in the subscription geohash may be filled with a wildcard character (such as '+' or another character, depending on the particular protocol). As such, different subscription geohash may be specified to different levels and still be included within a subscription.

Preferably, execution of the program code instructions at the processor further cause the client device to:
send a request to the server to unsubscribe from the subscription having a subscription name comprising the subscription geohash.

The geographical location previously considered to be relevant to the client device may stop being relevant after some time has elapsed. For instance, if the client device changes location. As such, the user of the client device may wish to unsubscribe from publications having the subscription name comprising the previously identified subscription name. To do this, the client device sends a request to unsubscribe including the subscription name comprising the subscription geohash within the class or topic string. Beneficially, this provides an efficient mechanism for the client device to manage subscriptions, and to avoid receipt of publications to 'old' subscriptions (and relating to geographical regions that are no longer of interest) after they are no longer relevant.

Preferably, execution of the program code instructions at the processor further cause the client device to:
determine one or more additional subscription geohash, representing a respective one or more geographical areas neighbouring the geographical area represented by the subscription geohash; and
send one or more additional subscriptions to the server, each of the one or more additional subscriptions having a respective subscription name comprising a different one of the one or more additional subscription geohash.

The additional subscription geohash each represent areas adjacent, nearby, neighbouring or bordering the original subscription geohash that was determined in earlier actions. Any number of additional subscription geohash could be identified. In a particular example, eight additional subscription geohash are determined, one for each of the geohash area to the north, north east, east, south east, south, south west, west and north west of the original subscription geohash, in order to form a grid of geohash with the original subscription geohash at the centre. In this way, subscriptions are made to areas encircling the original subscription geohash, and so ensuring receipt of publications relating to the immediate vicinity of the client device, and its surrounding area. This may be particularly advantageous when the client device is in motion, as the client will continue to receive relevant publication, even after small changes in its geographical position.

Preferably, execution of the program code instructions at the processor further cause the client device to, prior to determining the one or more additional subscription geohash:
determine a direction of motion of the client device; and
wherein the one or more geographical areas neighbouring the geographical area represented by the subscription geohash are one or more geographical areas based on the determined direction of motion of the client device.

The direction of motion may be expressed as a vector, and may represent a direction of movement of the client device between a first and second time, or may represent an instantaneous direction measured or received by the client device. In other words, the one or more geographical areas neighbouring the geographical area represented by the original subscription geohash are areas aligned along a vector in the direction of motion of the client device.

In an example, the one or more neighbouring geographical areas may be a first neighbouring area bordering the geographical area represented by the original subscription geohash in the direction of motion, such that a vector extending between the centre of the geographical area represented by the original subscription geohash and the centre of the first neighbouring area is a vector representing the direction of motion. The one or more neighbouring geographical areas may further include a second neighbouring area bordering the first neighbouring area in the direction of motion, such that a vector drawn between the centre of the geographical area represented by the original subscription geohash, the centre of the first neighbouring area and the centre of the second neighbouring area is a vector in the direction of motion. Any number of neighbouring areas may be determined in this way. Beneficially, this action effectively extrapolates the expected pathway for a moving client device, and then subscribes to receive publications relevant to areas that are on that future pathway. As such, useful location-based messages or alerts can be received at a client device before the client device is in the immediate vicinity to which the publications refer, and so the client device may receive advance-warning of issues relating to geographical areas ahead (traffic congestion, weather alerts etc.).

Optionally, the client device may be configured to:
determine a direction of travel of the client device;
determine one or more additional subscription geohash, representing a respective one or more geographical areas in the direction of travel of the client device and/or neighbouring the geographical area represented by the subscription geohash; and send one or more additional subscriptions to the server, each of the one or more additional subscriptions having a respective subscription name comprising a different one of the one or more additional subscription geohash.

Preferably, execution of the program code instructions at the processor further cause the client device to:
send a request to the server to unsubscribe from the subscription having the subscription name comprising the subscription geohash, and/or to unsubscribe from the subscription having at least one of the one or more additional subscriptions having the respective subscription name comprising the different one or more of the additional subscription geohash.

The client device may send a request to unsubscribe from the subscription with a subscription name comprising the original subscription geohash, or to unsubscribe from any one or more of the additional subscriptions comprising the additional geohashes, and relating to neighbouring areas. In this way, as geographical areas become no longer relevant to a client device (for example, because the client device is moving, and moves away from a previously relevant area), then the client device can unsubscribe from these 'old' subscriptions.

Preferably, execution of the program code instructions at the processor further cause the client device to repeat the steps after elapse of a time interval. In other words, each of the actions described above as taking place at the client device can be repeated (after elapse of a time period, or periodically), in order to subscribe to a new subscription comprising a new subscription geohash relating to a new geographical area. New additional subscriptions may also be sent relating to geographical areas neighbouring the area represented by the new subscription geohash. The actions may be repeated periodically, so that subscriptions can be regularly updated so as to relate to the most relevant geographical areas for the client device at a given time. This may be particularly advantageous when the client device is moving, as it allows new subscriptions to be sent from the client device as the client moves into new geographical areas.

Where the actions are repeated, it may be particularly advantageous that the client device both send new subscriptions and send a request to unsubscribe to any 'old' subscriptions that relate to areas that are no longer of interest to the client device. In a particular example, execution of the program code instructions at the processor may cause the client device to subscribe to new subscriptions relating to geographical areas forward of the device (i.e. forward with respect to a present location of the client device and following a determined direction of motion), and to unsubscribe from subscriptions relating to geographical areas backward of the device (i.e. backward with respect the present location of the client device and following a determined direction of motion). In this way, only the most relevant publications should be received at the client device. Furthermore, the client device can manage subscriptions based on its location in an 'automatic' manner, without user input.

Preferably, execution of the program code instructions at the processor further cause the client device to:
    determine a speed of the client device; and
    determine the time interval according to the speed.

The speed may be measured at the client device, or otherwise received as a measurement from another element of the system, or by any determined by any other reasonable means. The time interval (for instance, between repetitions of each of the actions at the client device, as discussed above) may be related to the speed by a predetermined relationship or algorithm. In a particular example, the time interval may be relatively shorter for relatively higher speeds. As a result, the period between updates of determining a geographical location relevant to the client device, and then for subscribing to the associated subscriptions, will be shorter when the client device is moving at faster speeds. This should prevent too great a distance being travelled by the client device between updates, and so assist in maintaining only relevant subscriptions by the client device.

Preferably, the one or more additional subscription geohash and the subscription geohash are a first set of one or more subscription geohash, and wherein upon repeat of the steps above after elapse of a time interval, a determined further one or more additional subscription geohash and a further subscription geohash are a second set of one or more subscription geohash, wherein execution of the program code instructions at the processor further cause the client device to:
    compare the first set of one or more subscription geohash with the second set of one or more subscription geohash; and
    send a request to the server to unsubscribe from any one or more subscriptions having the subscription name comprising a respective one or more subscription geohash that are within the first set of one or more subscription geohash but not within the second set of one or more subscription geohash.

In other words, upon each repetition of the actions at the client device described above, a new set of one or more subscriptions are sent to the server from the client device. The client device may compare a new set of subscriptions with a previous set of subscriptions, and only maintain subscriptions that either are in both sets of subscriptions or only in the new set of subscriptions. Any subscriptions that are only within the previous set of subscriptions can be unsubscribed from (by sending an unsubscription request from the client device to the server). In this way, only the most relevant and up-to-date subscriptions are maintained.

Preferably, execution of the program code instructions at the processor further cause the client device to receive, from the server, a message matching the subscription. As such, a publication by the server to a matching a subscription associated with the client device, will be received at the client device. The client device can then parse the payload of the publication. In this way the message of the payload may be displayed to the user at the client device, or otherwise actioned.

In a second aspect, there is described a server for use in a cellular network providing location-based publications using a publish/subscribe protocol, comprising at least one processor and at least one memory storing program code instructions, wherein execution of the program code instructions at the processor cause the server to:
    receive a subscription from a client device, the subscription having a subscription name comprising a subscription geohash.

The server may receive a subscription from the client device having a subscription geohash comprised within a subscription name as part of class or topic string of the subscription request. The server is not required to undertake any further calculation in relation to the location of the client device, or determination of any additional geohash relating to the client device. Accordingly, the computational steps to achieve location-based routing are primarily undertaken as actions at the client device, rather than the server.

Preferably, execution of the program code instructions at the processor further cause the server to:
    receive a message for publication to a matching subscription, the message having publication name comprising a publication geohash;
    determine if the subscription is a matching subscription; and
    if the subscription is a matching subscription then sending the message to the client device;
    wherein the subscription geohash and the publication geohash are each hierarchical data structures specified to a respective level, and the subscription is a matching subscription when, at each level that both the publication geohash and subscription geohash are specified, the publication geohash at a given level corresponds to the subscription geohash at the same level.

Any publication received at the server includes a publication geohash comprised within the publication name making up the class or topic string of the publication message packet. The publication geohash is an indication of the geographical area to which the message should be delivered. In principle, the publication geohash could be specified to any level (in other words, with any number of characters) depending on the required size of the geographical area for distribution. However, specifically within an example implementation in MQTT, the publication geohash has a predefined number of characters, and is specified to a predetermined level.

In any implementation, once a publication is received at the server, the server compares the publication geohash within the publication name to the subscription geohash within the subscription name of each recorded subscription. If the geohash correspond, the subscription is deemed to match the publication, and the server sends the publication to the client device associated with the matching subscription.

A correspondence between the publication and subscription geohash does not necessarily require that they are identical (although identical publication and subscription geohash would correspond). In particular, the server compares each level (each character) in the two geohash. To the extent that both a publication and subscription geohash are specified at a given level, the character must be the same at the given level in both the publication and subscription geohash for the two geohash to correspond. If one of the publication or subscription geohash is specified to a longer level than the other (in other words, one geohash is longer than the other), then the extra characters specified in the longer geohash are not considered within the comparison.

As noted above, in a specific example implementation within MQTT, the publication geohash would always comprise a predefined number of characters. The predefined number of characters would be equal to the maximum possible number of characters in the subscription geohash. In other words, the subscription geohash may comprise the same number of characters as the publication geohash, or fewer characters. In this case, the subscription is a matching subscription when, at each level that the subscription geohash is specified, the publication geohash character corresponds to the subscription geohash character at the same level.

Beneficially, this allows the server to make use of typical mechanisms within the publish/subscribe protocol (by comparison of the class or topic string of a publication and subscription), but without addition calculations relating to the intended geographical location or radius of a publication or subscription. As such, a message can be geocast without significant additional burden at the server compared to typical publish/subscribe messaging.

Preferably, the publication level defines the geographical area for the publication of the message, and the subscription level defines the geographical area for the subscription. The number of characters included in the publication geohash, and the number of characters included in the subscription geohash, determine the precision of the geohash, and so the size of the geographical area identified by the geohash. The specification level is related to the number of characters, whereby a higher level of the hierarchical data structure of the geohash is represented by fewer characters in the geohash string. As such, setting of the specification level for the subscription or publication geohash provides a simple technique for setting the geographical area of a corresponding subscription or a publication.

Preferably, the publication level is different to the subscription level. Generally, either of the publication or subscription geohash may be specified to a lower or higher level, although in a specific example implementation within MQTT, the publication geohash will be specified to the same level or to a lower level than the subscription geohash. Alternatively, the publication and subscription level may be the same.

Preferably, the subscription name includes a predefined number of characters, and wherein any characters of the predefined number of characters that are not filled by the subscription geohash specified to the subscription level are filled with a wildcard character and/or;
wherein the publication name includes the predefined number of characters, and
wherein any characters of the predefined number of characters that are not filled by the publication geohash specified to the subscription level are filled with a wildcard character.

The subscription and publication names may have the same predefined number of characters. As noted above, the publication and subscription geohash may be specified to any level, and may be specified to different levels. Within a given system, the class or topic string (in which the publication or subscription name is included in the message packet) may have a fixed number of characters. This determines the expected length for the publication or subscription name. In this case, any characters of the publication or subscription name that are not filled with characters of the publication or subscription geohash may include a predefined wild card characters (including, but not limited to '+'). As such, the server can manage and compare subscriptions and publications having a respective subscription or publication name comprising geohash of different length.

In a specific example implementation in MQTT, the publication name cannot include wildcard characters. In this case, the publication geohash will always include a certain number of characters, in order to 'fill' the characters of the publication name. Nevertheless, the subscription name can include wildcard characters within this specific example implementation in MQTT.

Preferably, execution of the program code instructions at the processor further cause the server to:
receive a request from the client device to unsubscribe from the subscription having the subscription name;
unsubscribe the client device from the subscription having the subscription name.

In other words, upon receipt of a request from a client device including a subscription name, the server unsubscribes the client associated with that client device from the subscription of that name. As such, the server no longer sends to the associated client device any publications received at the server and having a publication name matching the subscription name of the unsubscribed subscription.

In a third aspect, there is described a system, comprising:
the client device, as described; and
the server, as described.

In will be understood that each of the actions described above as taking place at the client device and the server can also be considered to describe corresponding steps of a method. As such, description of the benefits of each of the actions above should be considered to relate to the corresponding method steps below.

In a fourth aspect, there is described a method for use in a cellular network providing location-based publications using a publish/subscribe protocol, the method comprising:
determining, at a client device, a geographical location relevant to the client device;
determining, at the client device, a subscription geohash, to identify an area including the geographical location relevant to the client device;
sending, from the client device, a subscription to a server, the subscription having a subscription name comprising the subscription geohash.

Preferably, determining, at the client device, a subscription geohash comprises determining the subscription geohash specified to a subscription level.

Preferably, the method further comprises:
determining, at the client device, a speed of the client device; and
determining, at the client device, the subscription level based on the speed.

Preferably, the subscription name includes a predefined number of characters, and wherein any characters of the predefined number of characters that are not filled by the subscription geohash specified to the subscription level are filled with a wildcard character.

Preferably, the method further comprises:
determining a direction of motion of the client device;
determining, at the client device, one or more additional geohash, representing a respective one or more geographical areas in the direction of motion of the client device and/or neighbouring the geographical area represented by the subscription geohash; and
sending one or more additional subscriptions to the server, each of the one or more additional subscriptions having a respective subscription name comprising a different one of the one or more additional geohash.

Preferably, the method further comprises:
sending, from the client device to the server, a request to unsubscribe from the subscription having a subscription name comprising the subscription geohash;
unsubscribing, at the server, the client device from the subscription having a subscription name comprising the subscription geohash.

Preferably, the method further comprises repeating the steps of the method after elapse of a time interval. As an alternative, the method could comprise repeating the steps of the method after identification that the location of the client device has changed (for instance, that the location of the client device has moved outside a pre-defined radius of an immediately previously measured location).

Preferably, the method further comprises:
receiving, at the server, the subscription from the client device, the subscription having the subscription name comprising the subscription geohash;
receiving, at the server, a message for publication to a matching subscription, the message having a publication name comprising a publication geohash;
determining, at the server, if the subscription is a matching subscription; and
if the subscription is a matching subscription then sending the message to the client device;
wherein the subscription geohash and the publication geohash are each hierarchical data structures specified to a respective level, and the subscription is a matching subscription when, at each level that both the publication geohash and subscription geohash are specified, the publication geohash at a given level corresponds to the subscription geohash at the same level.

Preferably, the method further comprises:
receiving, at the client device, the message from the server.

In a fifth aspect there is a client device configured to perform the steps of the method as described above.

In a sixth aspect there is a server configured to perform the steps of the method as described above.

In a seventh aspect, there is a computer program comprising instructions which, when the program is executed by a computer, cause the computer to carry out the steps of the method described above. In particular, a first computer may carry out the steps identified as taking place at a client device, and a second computer may carry out the steps identified as taking place at the server. A communications interface may be arranged between the said first and second computer.

In an eighth aspect, there is a computer-readable medium comprising instructions which, when executed by a computer, cause the computer to carry out the steps of the method described above. In particular, a computer-readable medium at a first computer may carry out the steps identified as taking place at a client device, and a computer-readable medium at a second computer may carry out the steps identified as taking place at the server.

BRIEF DESCRIPTION OF THE DRAWINGS

The present invention will now be described, by way of example only, with reference to the accompanying drawings, in which:

FIG. 11 shows a set of example subscription and publication geohash.

In the drawings, like parts are denoted by like reference numerals. The drawings are not drawn to scale.

DETAILED DESCRIPTION OF THE INVENTION

Some examples will now be described more fully with reference to the accompanying drawings. The detailed description below describes aspects of a cellular network providing location-based publications using a publish/subscribe protocol. Such publish/subscribe protocol can be any protocol providing a mechanism for publication and subscription between broker at a server (such as a network server), and a client at a mobile or user device (described below as a client device). Commonly used examples of publish/subscribe protocols include Message Queuing Telemetry Transport (MQTT), which is an Internet of Things (IoT) messaging protocol. This protocol, as well as other known publish/subscribe protocols, maybe employed within the described invention. Specific details of the implementation in MQTT are discussed in more detail later in the description.

Publish/subscribe protocol is a messaging system widely used in cellular networks. Senders of messages, called publishers, do not program messages to be sent directly to specific receivers, called subscribers, but instead categorise messages for publication into classes (or topics). Similarly, subscribers express interest in (or subscribe to) one or more classes (or topics), and then only receive messages that are categorised by the publisher as being within a class to which the subscriber has subscribed.

Figure 1:
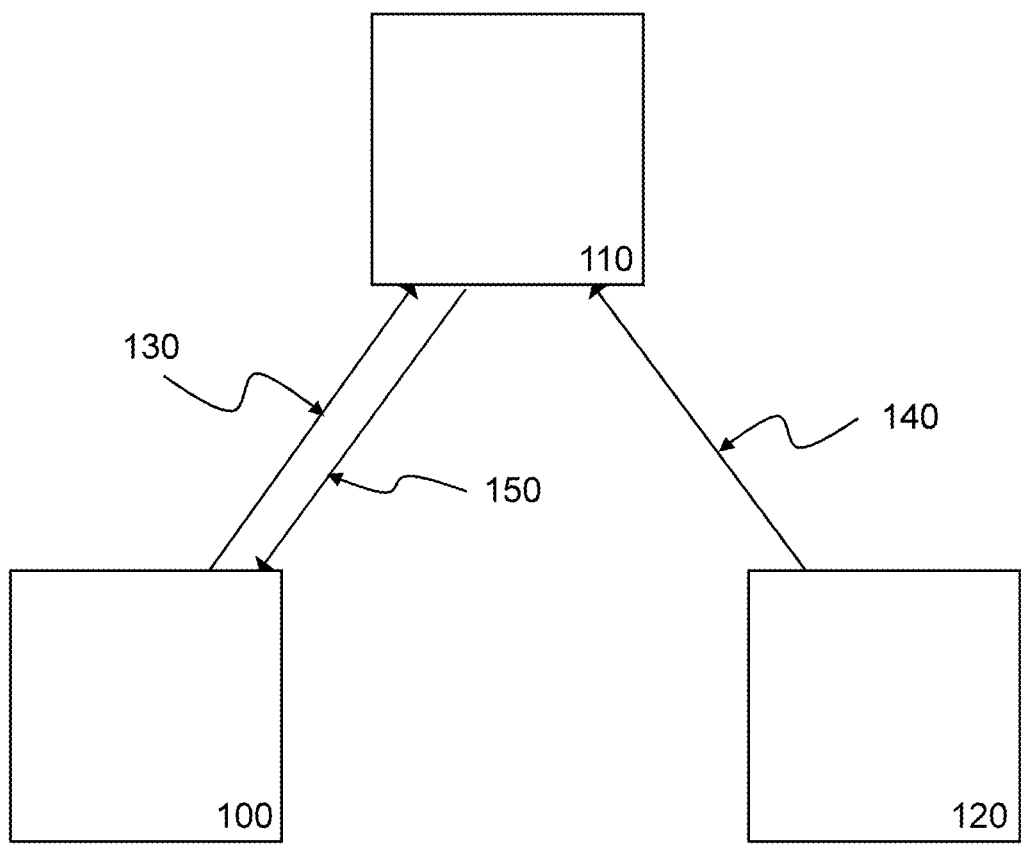
FIG. 1 is a schematic representation of a system for use in a cellular network providing location-based publications using a publish/subscribe protocol.

FIG. 1 shows basic elements within a cellular network for use within a publish/subscribe messaging mechanism. In particular, a client at a first client device (such as a mobile device of a first user) 100 sends a request 130 to a network server 110 to subscribe to a particular class of messages. The class for subscription may be specified in a header of the subscription request.

A client at a second client device (such as a mobile device of a different user) 120 sends a message 140 for publication by the server 110 to any relevant subscribers. More specifically, a class (or topic) for the message may be provided within a header of the message for publication.

Once the message 140 for publication is received at the server 110 (or a broker at the server), the server relates the message for publication to any matching subscriptions. The server identifies matching subscriptions by comparison of the class forming part of the subscription request with the class forming part of the message for publication. If the same class is specified in both message and subscription, the subscription is considered a matching subscription. The server 110 then transmits the message 150 for publication to each client (for instance, at first client device 100) associated with a matching subscription. In this way, a publication can easily be distributed to a number of different recipients, whilst only being distributed to recipients to whom the publication is relevant.

Figure 2:
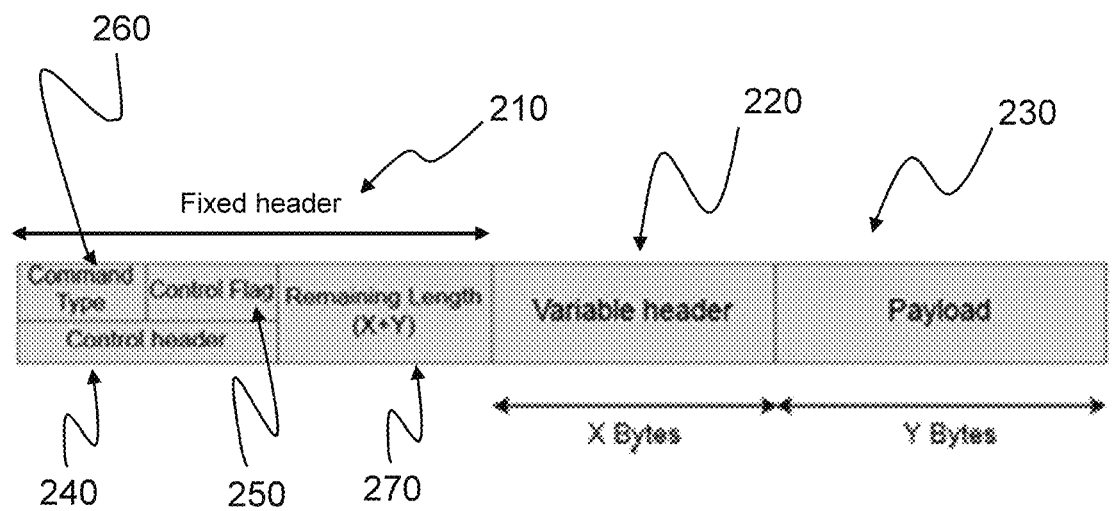
FIG. 2 shows an example publish/subscribe packet format.

A schematic showing the components of a typical packet for exchange between a client and a server in a publish/subscribe protocol is shown in FIG. 2. The specific example shown in FIG. 2 is for a packet within the MQTT protocol, but it will be understood that similar formats will be present in other publish/subscribe protocols.

In particular, the packet comprises a fixed header 210, a variable header 220, and a payload 230. The fixed header 210 comprises a control header 240 (including command type 260 and control flag 250) as well as an indication 270 of the total length of the subsequent variable header 220 and payload 230. The fixed header 210 will generally consist of two bytes, whilst the number of bytes in the variable header 220 and payload 230 are not necessarily fixed. The fixed header 210 will be present in all packets, whereas the variable header 220 and payload 230 need not always be included. For instance, in a packet for subscription at the server, the subscription packet may not include a payload 230.

Figure 3:
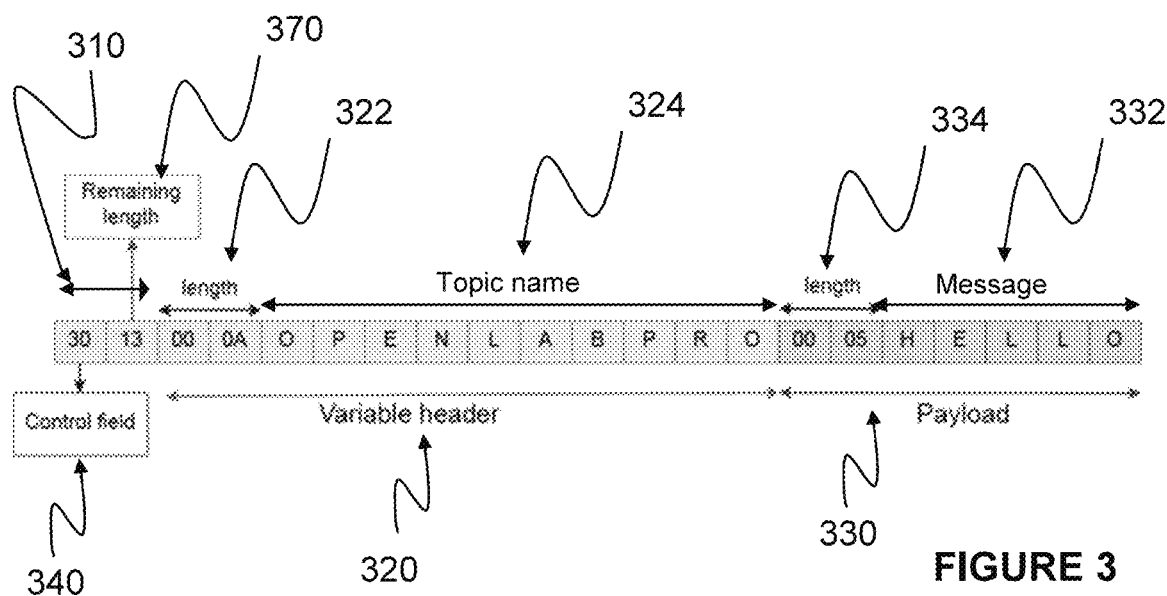
FIG. 3 shows an example publish packet for use in the publish/subscribe protocol.

FIG. 3 shows a specific example of an MQTT packet, providing a message for publication to subscriptions matching the class or topic name of the message. An MQTT packet is shown here as an example only, and it will be understood that other protocols may include packets having a similar, analogous structure. In the example of FIG. 3, the fixed header 310 comprises a control field 340, and also the remaining length 370 (expressed as the number of subsequent bytes in the packet). The variable header 320 is formed of a first two bytes denoting the length 322 of a topic (or class) name for use in the subscription/publication mechanism. As noted above, the topic or class is the name or label for the class of subscription to which the message should be published. The variable header 320 further includes the relevant topic (or class) name 324. Finally, the payload 330 provides the message 332 for publication, although again with the first two bytes of the payload denoting the length 334 of the message which follows. In the example of FIG. 3, the packet publishes the message "HELLO" to subscribers to the topic "OPENLABPRO", according to use of a command value "3" for publishing the packet.

Figure 4:
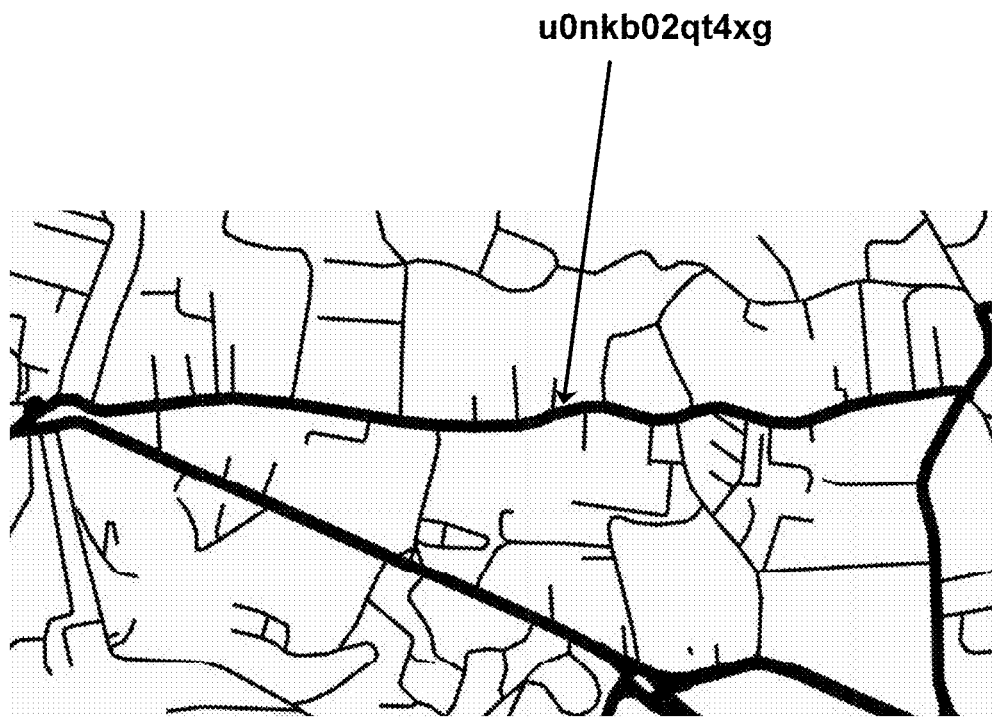
FIG. 4 is an example map identifying a geographical location using a geohash.

The present description makes use of geohashes for use in a publish/subscribe protocol for location based messaging. Geohashes are a public domain geocode system which encodes a geographic location into a short string of characters (letters and/or digits). Various publically available libraries can be used to associate a given geographical location with its geohash. As an example, FIG. 4 shows a twelve character geohash ('u0nkb02qt4xg') corresponding to a location on a map for the Vodafone Automotive S.p.A. offices.

Each geohash is a hierarchical spatial data structure which subdivides space into grid-like areas. Each additional character within the geohash represents an additional subdivision of the geographical area that was represented by the next highest level of the geohash. As such, geohashes offer arbitrary precision. An example of the precision of the geographical areas offered for different character length geohashes is shown in Table 1, below. The nature of the geohash structure means that the longer a shared prefix between two geohashes, the spatially closer they are together. Any number of characters can be used for the geohash to achieve a required precision of the location determination, but for reasons of efficiency the maximum number of characters shown is nine in Table 1.

TABLE 1

| Precision of geohash of different example lengths | | |
|---|---|---|
| Number of geohash characters | Width of area represented by geohash of this length (m) | Height of area represented by geohash of this length (m) |
| 3 | 156,000 | 156,000 |
| 4 | 39,000 | 19,000 |
| 5 | 4,800 | 4,800 |
| 6 | 1,220 | 1,220 |
| 7 | 152 | 152 |
| 8 | 38 | 19 |
| 9 | 4.7 | 4.7 |

As previously noted, the geohash is a hierarchical data structure. In the present description, the length or number of characters of the geohash is described as being specified to a given level. In particular, a higher level geohash has fewer characters (and represents a larger area), and a lower level geohash has more characters (and represents a smaller area).

Figure 5:
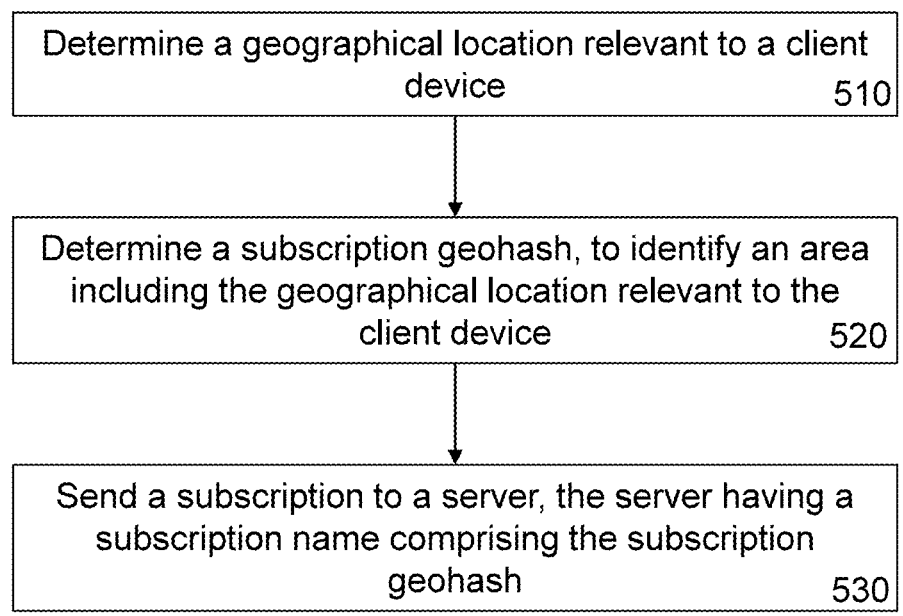
FIG. 5 is a flow diagram showing steps of an example method taking place at a client device for subscription to location based publications.

FIG. 5 shows a flow diagram with steps of a method for subscription to a publish/subscribe protocol in order to receive location-based publications. The steps of FIG. 5 take place at a client device (for instance, a mobile device or user equipment), which send the subscription to a corresponding server within the network. As such, the steps of FIG. 5 take place at a client device as part of a client/server relationship.

A client at a client device begins the process of subscription by determination 510 of a geographical location relevant to the client device. In a specific example, this is by determination of the location of the client device at a given time via a navigation or positioning system (such as Global Navigation Satellite System (GNSS), for instance Global Positioning System (GPS), Galileo, Beidou, or Glonass). However, in other examples, it could be a geographical location input to the client device by a user (for instance, using navigation software), or a location predefined to be relevant to the client (such as a 'home' location for the client device, for instance).

Next, the client device determines 520 a geohash representing an area that includes the geographical location relevant to the client device. In a particular example, the geohash represents an area having inside it a specific location of the client device (as identified by the positioning system). In the present description, this geohash is labelled as 'the subscription geohash' (as it is associated with a particular subscription sent by the client at the client device). However, this notation does not indicate any special characteristics for the geohash itself.

In a further step, a subscription request is sent 530 to a server (or more specifically, a broker at the server) from the client device. The subscription request is a packet as discussed above with respect to FIGS. 2 and 3, and comprises the subscription geohash within the character string identifying the class or topic of the subscribe/publish protocol. In a specific example, the class or topic string comprises a predetermined number of characters, consisting of the subscription geohash and/or wildcard characters. In particular, the subscription geohash may be formed of up to the predefined number of characters, or if the subscription geohash is shorter than the predefined number of characters, then any remaining characters of the class or topic string are made up by 'wildcard' characters (such as '+', although depending on the protocol used, any other type of characters could be used to distinguish wildcard characters from non-wild card characters).

For instance, the class or topic string of the subscribe/publish protocol may always comprise nine characters (although any number of characters could be used). In a first example subscription request, the class or topic string may comprise a geohash nine characters long (e.g. u0nkb02qt). However, in a second alternative example subscription request the geohash may be provided with less precision, and have fewer characters (for instance, only six characters). In this second example, the characters of the class or topic string which are not filled with the characters of the geohash will be taken up with wildcard characters (e.g. u0nkb0+++). As such, geohashes of different lengths (or levels) may be included in the class or topic string, and so geohash of different precision and relating to different sizes of geographical area can be used.

In a specific implementation of the described system which is implemented in MQTT, the structure of the subscription name (or topic name) may be as follows:

ClientID/Category/Subcategory/Geohash[1-3]/Geohash4/Geohash5/Geohash6/Geohash7/Geohash8/Geohash9

In this case, each numbered geohash character (for instance, Geohash4) is the character of the geohash at the given level (so, for instance, Geohash4 is the character at the fourth level of the subscription geohash). Any one of the numbered geohash characters, and then any subsequent numbered geohash characters, can be replaced by a wildcard character in the subscription, as described above.

Beneficially, the steps of the method shown in FIG. 5 take place at the client device. Therefore, the subscription geohash representing a geographical area for a subscription request is calculated at the client device, rather than at a server. This makes the handling of a large number of subscriptions less intensive at the server, and increases scalability of the system overall. Moreover, that inventors have recognised that by calculation of the geohash at the client device, the typical structure for a subscription request packet in publish/subscribe protocol can be used, with the geohash included in the packet header. As such, the server does not need to analyse any portion of the payload.

According to the method discussed above with respect to FIG. 5, a client device subscribes to a class of messages having a subscription name comprising a subscription geohash, in order to receive from the server any publications that are relevant to the geographical area denoted by the subscription geohash. Nevertheless, as will be understood by the skilled person, the geographical location relevant to the client device may change over time, for instance if the geographical position of the client device changes. As such, new subscriptions may be desired, and some existing subscriptions may become irrelevant (and so the user may wish to unsubscribe from existing subscription) and subscribe to new one.

Figure 6:
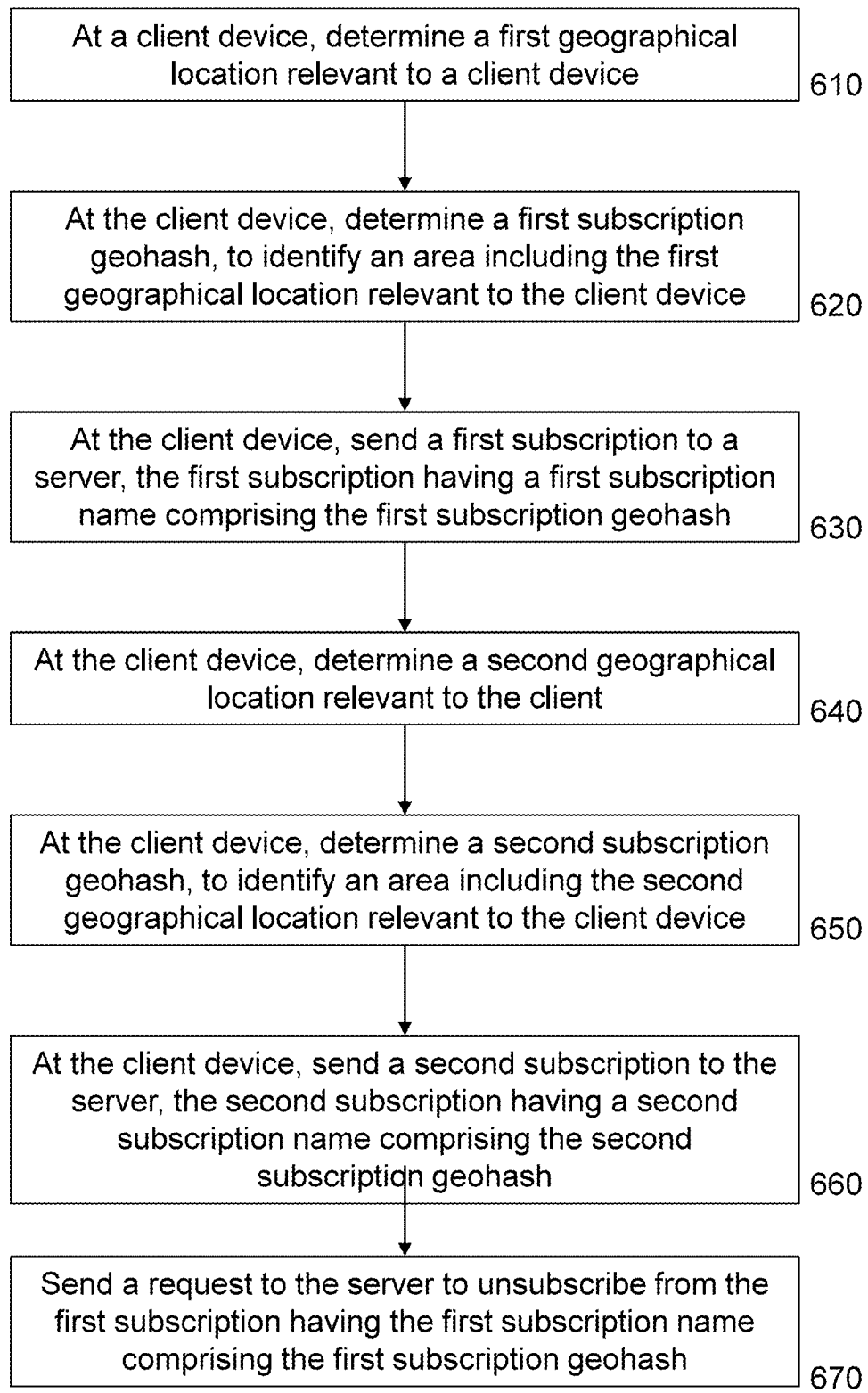
FIG. 6 is a flow diagram for a further example method taking place at a client device for subscription to location based publications.

FIG. 6 illustrates steps for updating a subscription and unsubscribing from an existing subscription. Specifically, in the same way as discussed above with respect to FIG. 5, the client device determines 610 a first geographical location relevant to the client device. In a particular example, this is the position of the client device at a first time, t0, according to a navigation or positioning system (Global Navigation Satellite System, GNSS), but could also be a relevant location input to the device from a user, for instance. The client device determines or computes 620 a first subscription geohash to identify an area including the first geographical position relevant to the client device, as discussed above. The first subscription geohash is then used within the subscription name included within the class (or topic) string of a subscription sent 630 from the client device to the server.

The client then determines 640 a second geographical location relevant to the client device. In a particular example, this is the position of the client device at a second time, t1, according to a navigation or positioning system, after elapse of a time interval from a second time. In particular, the client device may be moving (or may have moved relative to the first position), and thus the user may wish to receive publications relevant to its new position. The client device determines or computes 650 a second geohash for the second geographical position relevant to the client device. This second geohash (the second subscription geohash) is then used within a subscription name included within the class (or topic) string of a second subscription sent 660 from the client device to the server. As such, the client device is then subscribed to two separate subscriptions at the server, relating to two different (although possibly overlapping) geographical areas.

Nevertheless, once receiving publications related to a present geographical position, it may then be desirable to stop receiving publications for a previous location. Accordingly, the client device now sends 670 a request to the server to unsubscribe from the first subscription having the subscription name comprising the first subscription geohash. This request to unsubscribe will take the form of a packet in much the same way as discussed above with respect to FIGS. 2 and 3, although with an appropriate command value in the control header.

In a still further advantageous example, in addition to the steps of FIG. 6 a speed of the client device may be determined. This may be a present, instantaneous speed, or an average speed over a predefined period of time, for example. Once the speed has been determined, the time interval between the first, t0, and the second, t1, time mentioned above may be determined based on the speed. For example, a predetermined relationship or algorithm may be used to determine the time interval based on the speed of motion of the client device.

In this way, a time interval between sending a first and a second subscription may be related to the speed of motion of the client device. As such, the time interval is effectively related to a 'sampling frequency' for the location of the client device, and a subsequent update of the relevant subscription. For example, the speed and the length of the time interval may be inversely correlated, such that the time interval is shorter when the speed of travel is quicker. In this way, the subscriptions are 'updated' to be responsive to new locations of the client device at appropriate intervals. Furthermore, in a similar manner to that described above, the client device can unsubscribe from subscriptions relating to previous or old locations that are no longer relevant in a timely manner. As such, only relevant publications are received at the client device, and especially a client device that is in motion.

Figure 7:
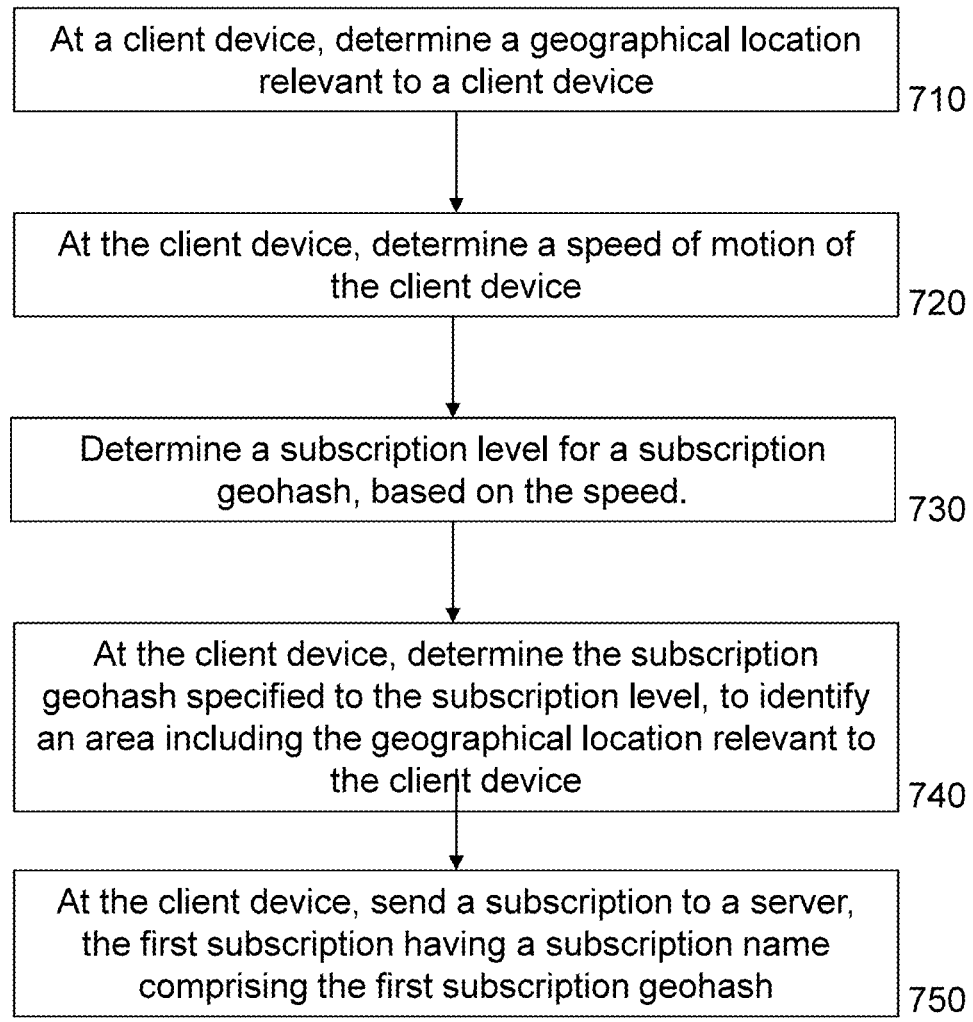
FIG. 7 is a flow diagram for a still further example method taking place at a client device for subscription to location based publications.

A further example of the steps taking place at a client device are shown in FIG. 7. In this case, the client device is in motion. After determining 710 a geographical location relevant to the client device (such as a position identified by a navigation or positioning system), the speed of motion of the client device is determined 720. The speed may be determined according to the distance between a position of the client at a first time and a position of the client at a second time (wherein speed=Δdistance/Δtime), for instance. Alternatively, the speed could be received from measurements elsewhere (for example, from a measurement at a speedometer in a vehicle in which the client device is comprised).

Figure 8:
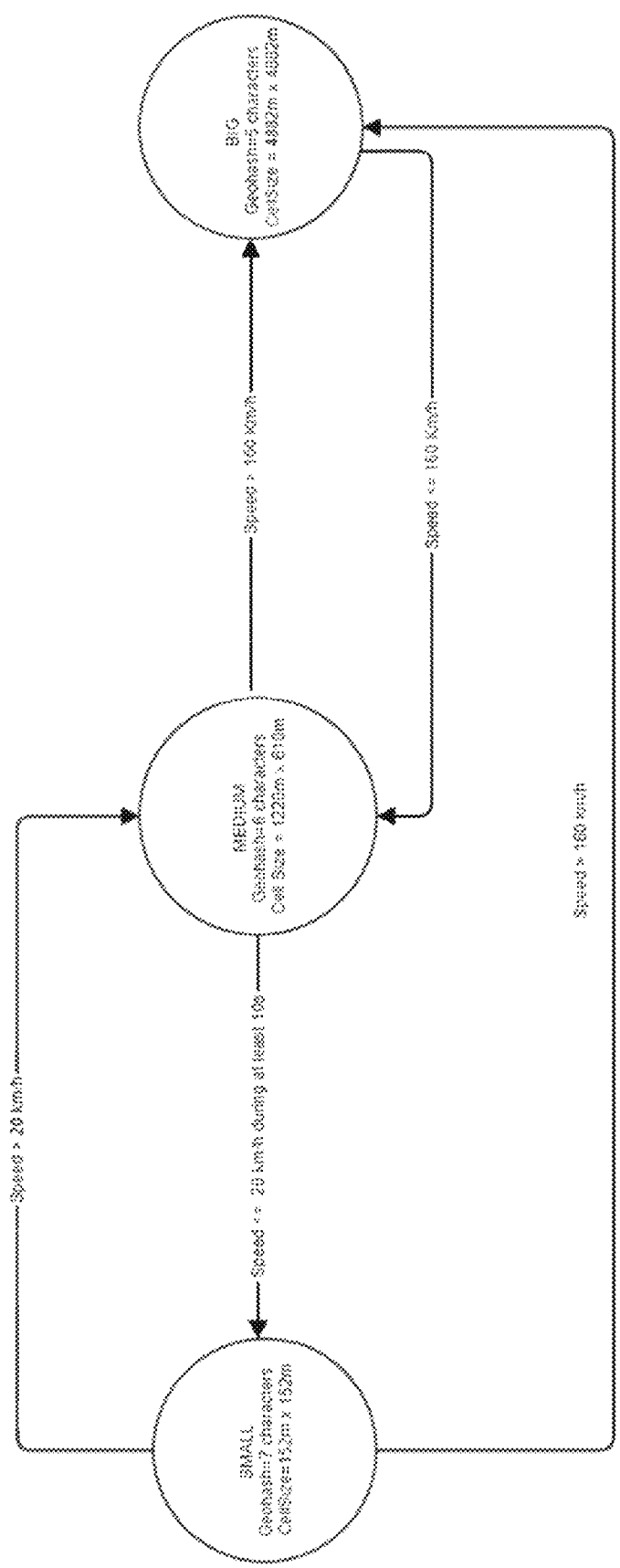
FIG. 8 shows a decision tree for associating a measure speed for the client device with a level to which a subscription geohash is to be specified.

Once determined, the speed can be used at the client device to set 730 the level (herein denoted the 'subscription level') to which the subscription geohash is specified. In particular, according to a predefined relation, the determined speed of the client device within certain predefined intervals corresponds to a specific number of characters to be specified in the subscription geohash (and so the subscription level). As noted above the subscription level defines the size of the area identified by the geohash, and so in this way the size of the geographical area for the subscription is determined by the speed of motion of the client device. In particular, a faster speed for the client device may be associated with a geohash specified to a higher level (so with fewer characters), and so represent a larger geographical area (and so subscribe to publications directed within a larger geographical area). In contrast, a slower speed for the client device may be associated with a geohash specified to a lower level (so with a greater number of characters), and so represent a smaller geographical area (and so subscribe to publications directed within a smaller geographical area). The particular relationship between the determined speed of the client device and the specification level is discussed further below with reference to FIG. 8.

Referring to FIG. 7, once the subscription level has been determined 730, the client device determines 740 the subscription geohash, specified to the subscription level, identifying the geographical position relevant to the client device. Then, as described in relation to FIGS. 5 and 6 above, the client device sends 750 a subscription to the server, wherein the subscription name comprises the subscription geohash specified to the subscription level.

Beneficially, the described client device therefore subscribes to receive publications broadcast to relevant geographical areas of different sizes without complex or computationally expensive calculations at the server, or without specific input from the user. The size of the relevant geographical area may be correlated to the speed of travel of the device, wherein subscription is made to receive publication directed to a larger area when the device is moving more quickly.

As noted above, the speed of the client device can be used to determine the level to which the subscription geohash is specified. This association between determined speed and specification level of the subscription geohash is shown in more detail in FIG. 8. In particular, the speed can be separated into a plurality of contiguous ranges. Each range can then be associated with a level to which the subscription geohash should be specified. For example, the expected measured speed can be separated into three ranges of: less than or equal to 20 km/s; greater than 20 km/s and less than or equal to 160 km/s; greater than 160 km/s. When the determined or measured speed fall within the first, slowest range, then this is associated with a specification level of 7 for the subscription geohash (i.e. a 7 character geohash). Alternatively, when the determined or measured speed falls into the second, middle range, this is associated with a specification level of 6 for the subscription geohash (i.e. a 6 character geohash). Finally, where the determined or measured speed falls into the third, fastest range, then this is associated with a specification level of 5 for the subscription geohash (i.e. a 5 character geohash). Therefore, the specification level is inversely correlated to the measured speed for the client device, and the geographical area denoted by the geohash scales with the speed.

Further benefits can be obtained by the client device subscribing to receive publications relevant to one or more additional geographical areas around or neighbouring the geographical location relevant to a client device. To do so, the client initially performs the steps according to FIG. 5 as discussed above, in order to send a subscription to a server, the subscription having a subscription name comprising the subscription geohash. However, subsequently or in parallel to determining the subscription geohash identifying the area including the geographical location relevant to the client device, at least one additional subscription geohash is determined at the client device.

In particular, the at least one additional subscription geohash identifies a respective at least one geographical region neighbouring the geographical location relevant to the client device. The neighbouring regions may be adjacent the geohash area including the geographical location relevant to the client device, for instance, and in some examples may be bordering the geohash area including the geographical location relevant to the client device. The additional subscription geohash may identify areas that are somewhat overlapping with the geohash area including the geographical location relevant to the client device, or overlapping each other. In one example, the geographical regions to the North, North East, East, South East, South, South West, West and North West of the geohash area including the geographical location relevant to the client device may each be identified in an additional subscription geohash. In this way, a plurality of additional subscription geohash represent regions that encircle the geographical location relevant to the client device.

Each of the additional subscription geohash may then form the basis of an additional subscription, sent by the client device to the server. In particular, the client device may send one or more additional subscriptions, each having a subscription name comprising a different one of the additional subscription geohash. Accordingly, the client device is subscribed to a 'grid' of locations in the vicinity of or around the geographical location identified to be relevant to the client device.

As will be understood by the skilled person, the additional subscription geohash may be specified to a different subscription level than compared to the subscription geohash representing an area including the geographical location relevant to the client device. In any case, provision of such additional subscriptions provides more comprehensive coverage of any area relevant to the client device and its surroundings.

In a still further example, the additional subscriptions mentioned may relate to geographical regions in a direction of motion (or direction of travel) of the client device. This can be beneficial to provide subscriptions to publications or alerts relating to areas in the path of a moving client device. Such an example may have particular advantages when the client device forms part of a moving vehicle, and the publications relate to traffic alerts, for example.

Figure 9:
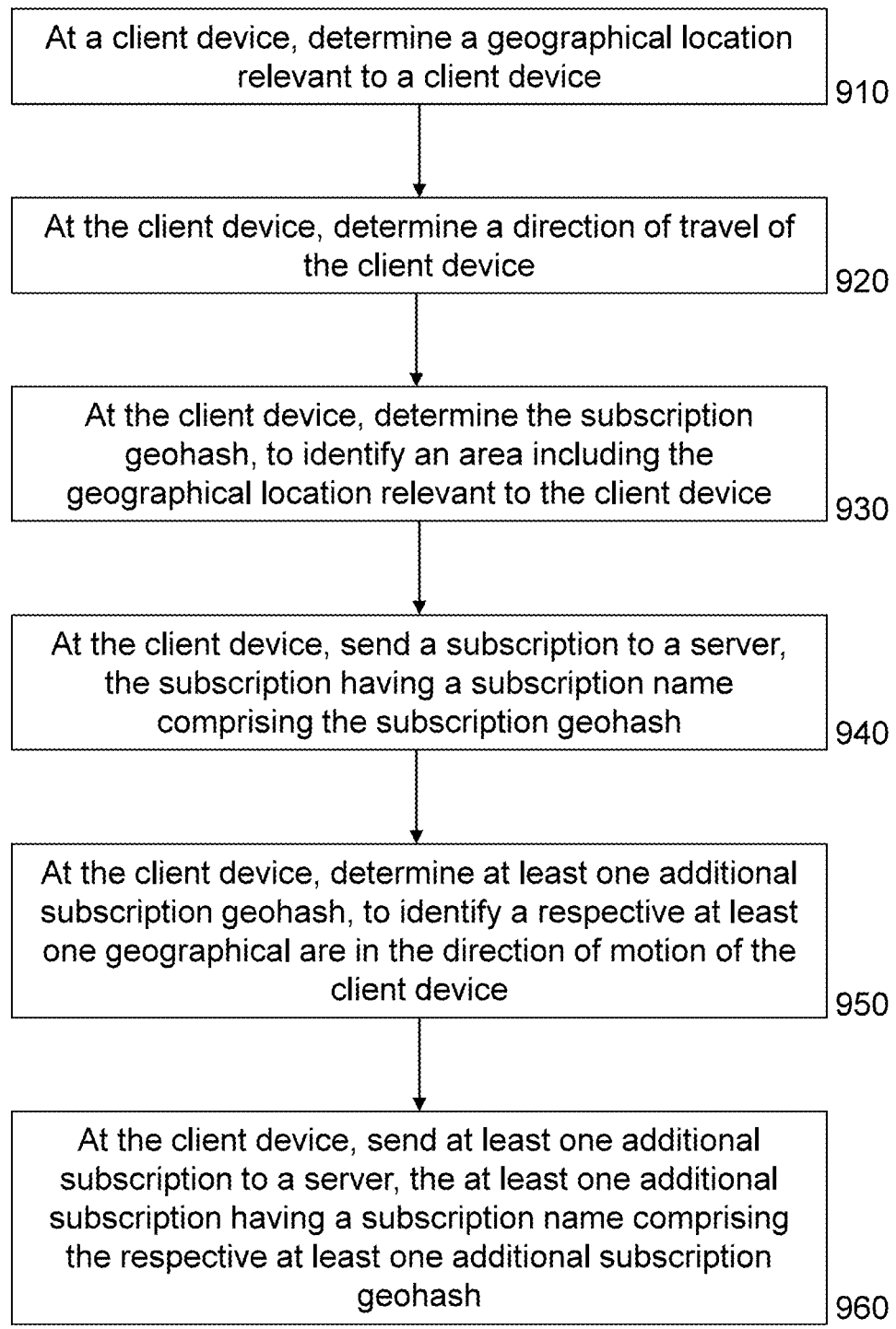
FIG. 9 is a flow diagram for a yet still further example method taking place at a client device for subscription to location based publications.

The steps performed at a client device in relation to this example are shown in FIG. 9. First, a geographical location relevant to a client device is determined 910 at the client device. Next, a direction of motion of the client device is determined 920 at the client device. This may be determined from a measurement of the velocity, for example, or simply as a calculation of the vector between two measured locations of the client device.

Next, a subscription geohash is determined 930 by the client device, the subscription geohash representing an area including the geographical location relevant to the client device. Optionally, the specification level of the subscription geohash may be determined by the speed (in other words, the scalar part of the velocity), as described above with respect to FIGS. 7 and 8. Subsequent to determining the subscription geohash, the client device then sends 940 a subscription to the server, having a subscription name comprising the subscription geohash.

Then, in a manner similar to that described above, the client device determines 950 one or more additional subscription geohash. In this case, the one or more subscription geohash identify geographical regions in the direction of motion of the client device. In a specific example, three additional subscription geohash are determined so as to represent areas aligned along a vector in the direction of motion of the client and bordering each other. Therefore, in this example the three additional geohash comprise a first additional subscription geohash bordering, in the direction of motion, the subscription geohash identifying the area including the geographical location relevant to the client device, a second additional subscription geohash bordering, in the direction of motion, the area represented by the first subscription geohash and a third additional subscription geohash bordering, in the direction of motion, the area represented by the second subscription geohash.

Once the additional subscription geohash have been determined, subscriptions are sent 960 from the client device to the server. Each subscription has a subscription name comprising a respective one of the additional subscription geohash. In this way, subscriptions to publications directed to areas aligned along the prospective pathway of a client device are sent.

Although three additional subscription geohash are described above, it will be understood that any number of additional subscription geohash could be determined. The number of additional subscription geohash may depend on a determined speed of the client device, such that a greater number of additional subscription geohash relating to areas aligned in the direction of motion are determined when the speed of travel is faster. In this way, subscriptions can be sent to the server for regions in which the client device is likely to move through in the near future. Thus, this may 'pre-empt' subscriptions based on the client device specific location. In a specific example where the client device forms part of or is within a vehicle, this allows subscription to traffic alerts relating to the road ahead, for instance.

Figure 10:
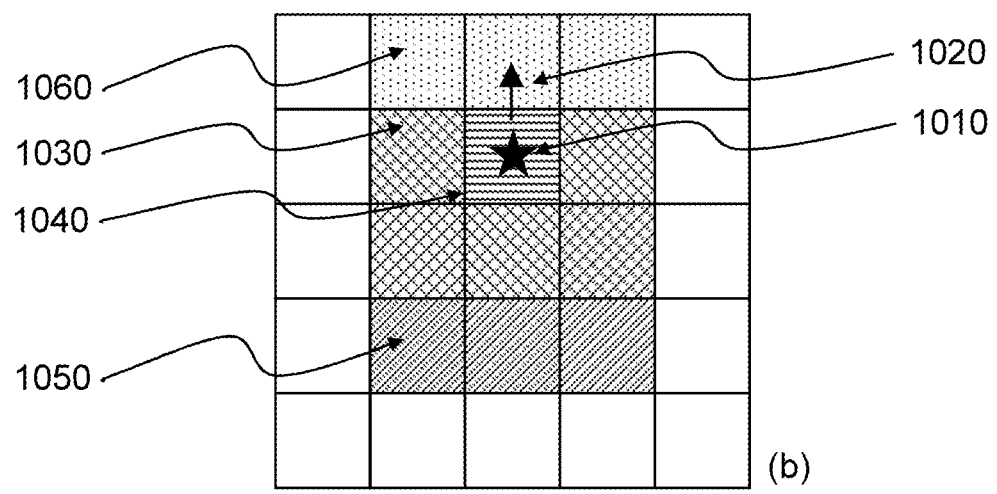
FIG. 10 is a schematic diagram showing the change in relevant geohash area to a moving client device.
Figure 10:
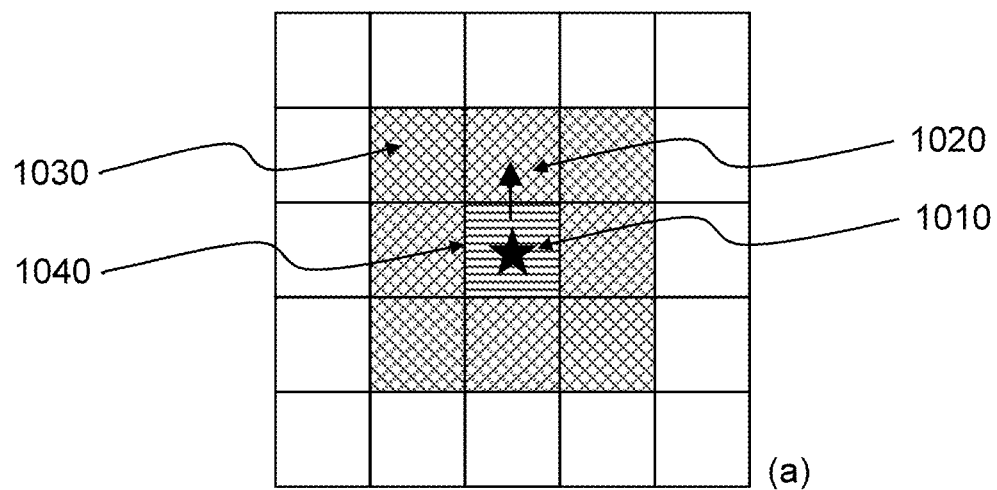

FIG. 10(*a*) shows a schematic representation of a grid of additional subscription geohash (cross hatched boxes, 1030) surrounding the geohash area (horizontal hatch box, 1040) including the location relevant to the client device and determined at a time to. The client device 1010 is shown as a star, and the direction of motion of the client device is marked with an arrow 1020. Each box within the grid represents a separate geohash area, in this case each representing the same level of precision (so each geohash is specified to the same level).

After elapse of a time interval, at time t1 the client device has moved forward in the direction of the illustrated direction of motion. A new grid of additional subscription geohash surrounding the new geohash area (horizontal hatch box, 1040) relevant to the client device is shown in FIG. 10(*b*). It can be seen that five of the geohash regions (cross hatched boxes, 1030) are common (or overlap) between both of FIGS. 10(*a*) and 10(*b*).

However, FIG. 10(*b*) shows three 'old' regions (diagonal hatch boxes, 1050), which are now redundant—in that these subscription are no longer of interest to the client device (and are 'behind' the client device in its direction of travel). Accordingly, a request to unsubscribe from messages published to these areas may be sent to the server from the client device, in the form of three unsubscribe requests, each including a subscription name comprising a different one of the subscription geohash related to these 'old' regions.

Similarly, FIG. 10(*b*) shows three 'new' regions (dotted boxes, 1060), which are now neighbouring the geohash region in which the client device is location. As such, publications sent to these 'new' areas may be of interest to the user of the client device. Accordingly, subscriptions can be sent from the client device relating to these 'new' areas and including as a subscription name one of each of the subscription geohash identifying the 'new' regions.

As will be understood by the person skilled in the art, the client device may periodically check its location and, upon identifying a new location then proceed to identify the subscription geohash related to its new location, and any additional subscription geohash related to regions neighbouring the client device's new location. The client device may then compare the newly identified subscription geohash with geohash used within previous and current subscriptions. In this way, the client device may identify 'overlap' between the newly identified geohash and previously identified geohash. The client device may then proceed only to subscribe to subscriptions having a subscription name comprising a new subscription geohash that does not already relate to a 'live' or 'current' subscription.

In any case, each of the steps described above may be repeated periodically, in order to subscribe to 'new' areas, and to unsubscribe to 'old' areas as the client device travels along a pathway. The period or time interval between updates may depend on the speed of travel of the client device, with updates taking place more regularly when the client device is moving at higher speeds.

The components of the system, including a first client device and a server, as well as an optional second client device, were discussed above with reference to FIG. 1. FIGS. 5 to 10, together with their accompanying description, for the most part focus on operations at the client device, in order to send one or more subscriptions, each subscription having a subscription name comprising a subscription geohash. Although the client device and its configuration, as described above, demonstrates a number of beneficial features and characteristics, it also forms part of a system that itself has a number of advantages.

The server manages the subscriptions received from each client device, as well as handling the sending of publications to matching subscriptions. In particular, the server receives, from a client device (for instance, the second client device of FIG. 1) a packet comprising a message for publication to matching subscriptions. The packet may have the format described above with respect to the example of FIG. 3. In particular, the packet may include in the variable header a topic or class string and the payload comprises the message for publication. In the presently described system, this topic or class string comprises a publication geohash. The publication geohash identifies a geographical location to which the publication is relevant. For instance, this location could be a relevant location as identified by the sender of the message for publication.

Upon receipt of the packet comprising a message for publication, the server identifies matching subscriptions, and then sends or transmits the message to the client devices associated with those matching subscriptions. The server identifies matching subscriptions by comparison of the class or topic string of the message for publication with the class or topic string of each subscription. If both a publication and subscription relate to the same class or topic, they are considered to be corresponding.

As such, in the presently described system the server compares the publication geohash comprised in the publication name of the message for publication with the subscription geohash comprised in the subscription name for each subscription registered at the server. If the publication and subscription geohash correspond, then the publication is considered to be matching.

The publication and subscription geohash do not need to be identical in order to correspond (although identical geohashes would be considered to correspond). In particular, the publication and subscription geohash may each be specified to a different level (i.e. have a different number of characters). In this case, the publication and subscription geohash are considered to correspond if, to the lowest level that both geohashes are specified, they have the same characters within the class or topic string.

As noted above, any characters of the class or topic string which do not include a geohash character (i.e. that exceed the number of characters to which the geohash is specified) can contain a wildcard character, e.g. '+', in the variable header of the packet. As such, the class or topic string of a subscription and publication may be of the same length (having a predefined number of characters), but comprise geohash of different lengths.

For instance, if the subscription geohash has five characters (in other words, is specified to the fifth level, for subscription to a relatively larger area), but a publication geohash has seven characters (in other words, specified to the seventh level, representing a relatively smaller area), then the subscription and publication geohash correspond if the first five characters of the publication geohash are identical to the five characters of the subscription geohash. Inclusion of additional characters at levels six and seven of the publication geohash is not of concern, as the matching of the first five characters in both geohash denotes that the area represented by the publication geohash is within the area represented by the subscription geohash. Therefore, the publication is relevant to this subscription. Accordingly, the subscription of this example would be deemed to match the publication.

Considering the same examples for the publication and subscription geohash, if only the first four characters of the two geohashes are the same, but the fifth character is different, then this would be considered not to correspond. In this case, the geographical area represented by the publication geohash is not within the geographical areas represented by the subscription geohash, but each geohash represents a different subset of a larger area. As such, the message for publication is not considered to be relevant to the client device associated with the subscription. As the message for publication does not match the subscription in this case, the server would not send the message to the client device associated with this subscription.

We note that although, in this example, the publication geohash is specified to a lower level than the subscription geohash (in other words, the publication geohash comprises more characters than the subscription geohash), this is not necessarily the case. In a general example, either geohash could be specified to any given level, so that either of the subscription or publication geohash may be specified to a lower level than to the other. Alternatively, both geohash may be specified to the same level. Nevertheless, in the specific implementation within MQTT, the publication geohash will be specified to either the same level or to a lower level, than the subscription geohash, as described further below, but would not be specified to a higher level than the subscription geohash. As such, in MQTT a matching subscription and publication denotes that the area represented by the publication geohash is within (or the same as) the area represented by the subscription geohash.

Figure 11:
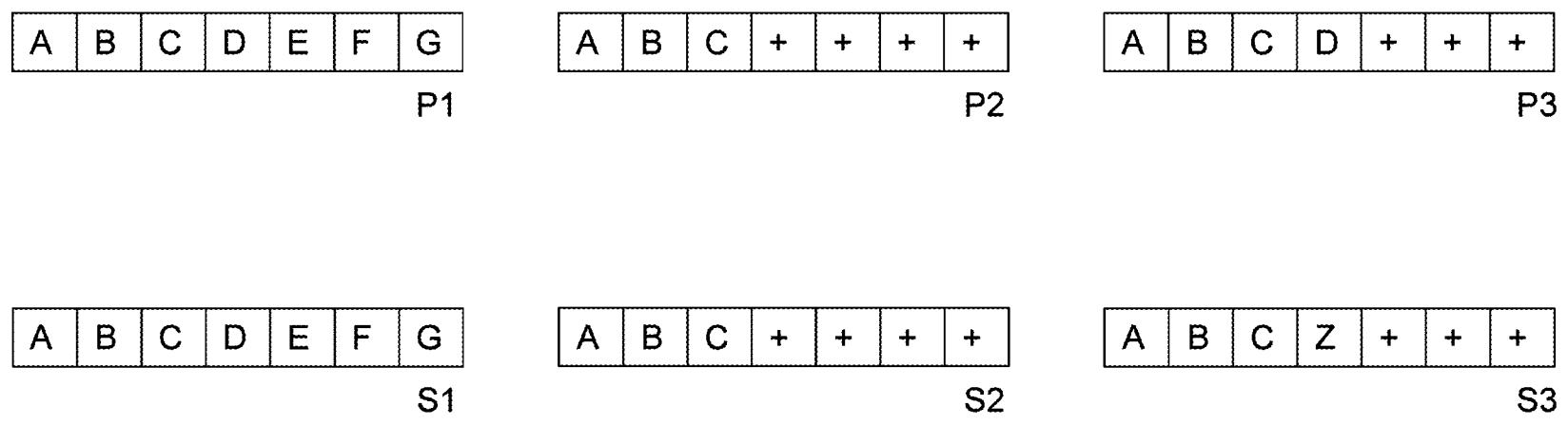

As further general examples, FIG. 11 shows a number of subscription geohash (S1, S2, S3) and publication geohash (P1, P2, P3). It should be noted that each of these geohash form part of a string of the same length (each having seven characters). Where the geohash is not specified to the level required to fill the string, a wild card character, '+', is included instead.

Comparison of these geohash by the server in order to identify a subscription matching a publication would yield different results. TABLE 2, below, shows a '✓' where the publication or subscription geohash would be considered to correspond, and a 'χ' where the publication or subscription geohash would be considered not to correspond.

TABLE 2

Correspondence of publication and subscription geohash shown in FIG. 11.

|    | P1 | P2 | P3 |
|----|----|----|----|
| S1 | ✓  | ✓  | ✓  |
| S2 | ✓  | ✓  | ✓  |
| S3 | X  | ✓  | X  |

Use of geohash within the subscription name and publication name in this way provides a number of benefits. First, by provision of a geohash directly within the class or topic string of a subscription or publication packet in a publish/subscribe protocol, no significant changes are required to the server or its configuration. In particular, comparison of the class or topic string in a message for publication and in a subscription follows the typical processes for a publish/subscribe protocol. As the geohash are calculated at the client device sending the subscription or publication, the server is not required to undertake additional steps to compute the geohash based on a navigation or positioning system location and a radius provided by a client device, for example. Moreover, no additional steps are required to identify if a specific location provided in relation to a publication falls within an area represented by a geohash for a subscription. Instead, the comparison is purely of the characters of the topic or class string. As such, the system and method is scalable to send a large number of location-based messages without requiring dramatically increased computation resources at the server than required by typical publish/subscribe systems. The described system and method also reduces complexity.

In the above, general example of the system, it is noted that the subscription geohash and the publication geohash can be specified to any desired level (or length). In the general example, where the subscription geohash and the publication geohash contain fewer characters than the number of characters required to fill the subscription name or publication name, respectively, then any remaining characters can be filled with a wildcard character. Notwithstanding this general example, in a specific implementation of the described system within MQTT, wildcard characters cannot be used within a publication name, but only in the subscription name (for subscribing and unsubscribing operations). As such, in an MQTT implementation the publication geohash will always be specified having the predefined number of characters required to 'fill' the publication name. In an MQTT implementation, the subscription geohash will be specified to the same level (and therefore have the same number of characters) as the publication geohash, or will be specified to a higher level (and therefore have fewer characters than) the publication geohash. In view of this, looking to the examples of FIG. 11, only a publication geohash of the type shown as P1 in FIG. 11 would be used. In that case, either S1 or S2 would be considered matching subscriptions, whereas S3 would not be considered a matching subscription.

A specific application of the invention is considered, relating to the provision of transport notifications. For instance, the client device may be within or form part of a vehicle, and the system may be arranged to provide traffic alerts. In a specific example, all the messages are exchanged using MQTT as the client/server publish/subscribe protocol. Each user (vehicle, road operator, pedestrian, or cyclist etc.) is associated with a client device configured to provide a MQTT client associated with an MQTT broker at a network server.

In this example, each user can send messages from the client device to the broker and specifies a topic or class for the message. Furthermore, each user can receive messages by subscribing to one or several topics on the broker. When a message is published by a client on a specific topic, the broker forwards it to all clients which subscribed to the specific topic (or which subscribed to a pattern matching topic, for instance if a wildcard character has been used in the subscribed topic). In the case of the present invention, the topics are comprised of geohash, as described above.

According to this specific example, messages can be published relating to a specific geographical location, and then transmitted (or forwarded) to a client device (and their users) who have subscribed to receive messages relevant to that geographical location. In this way, users can receive traffic alerts in their vehicle, for instance, where the alerts have been published as messages from a client device within another part of the transportation network.

Moreover, with this solution the vehicles receive only relevant messages (for instance, messages related to their current or future location). This solution is inexpensive because the infrastructure requires only a server (for example, hosting a MQTT broker) and client device (for example, hosting an MQTT client). No significant development is required on the server side, as all the location-based publication is achieved though the routing procedures already available in publish/subscribe protocols (for example, in MQTT), by the specific topic structure used and by the automatic subscription mechanism described. In summary, the described solution is:

quick to deploy (especially for proof of concept) as only a broker needs to be deployed at a server;

highly scalable;

efficient with low latency as the messages are not parsed by the broker;

improvements in performance (reduced central processing unit, CPU, time) and in privacy, as the system can route the messages without parsing their content;

has the ability to support a large number of messages (MQTT is an IoT standard, for instance);

easy to integrate on a client device side (for example, at a vehicle), as there are a number of publish/subscribe client libraries available for different programming languages and for integration into different operating systems (for example, the Paho MQTT client library is available for C and Java languages);

certain protocols such as MQTT are able to support bigger messages (up to 65 KB) than compared to a solution based on user datagram protocol, UDP; and classes or topics for messages can be created on-the-fly by the client, at the client device.

The skilled person will understand that the described system could be used in various implementations in which location-based alerts would be advantageous. For instance, although the system is described above in relation to vehicle telematics, it could be applied to a number of other fields and functions. These include: natural disaster alerts (e.g. tsunami and earthquake alerts); weather alerts (e.g. hurricane, snow, flood, high wind alerts); fire alerts; health alerts (e.g. pandemic or virus prevalence alerts); pollution alerts; high pollen count alerts; radioactivity alerts; trade or commercial promotions; and/or tourist attraction or point of interest notifications. Any number of implementations could be envisaged.

In the description above, the client device used for either subscription or publication may be any device configured to communicate over a network, and more specifically over a cellular network. The client device may be any type of mobile or user device or user equipment, including but not limited to a mobile terminal, a cellular telephone, a personal digital assistant (PDA), a laptop computer, a tablet computer, a personal computer, any hand-held or personal communication device, a universal serial bus (USB) dongle or a data card, for example. It is anticipated that the client device could also be a fixed or non-mobile device, such as a server or other computer device.

The client device will be configured to host the client of the publish/subscribe protocol. Accordingly, the client device will comprise at least a memory and a processor, wherein execution of program instructions stored at the memory and executed on the processor cause the client device to undertake certain steps and perform certain functions. The client device further comprises at least one communications interface for transmission of a subscription and/or receipt of a publication. The client device may include various other hardware and software features, such as a navigation or positioning system transceiver (for instance a transceiver for use in a Global Navigation Satellite System (GNSS)).

The server for the above described system is a server within a cellular network. The server is configured to host a broker of the publish/subscribe protocol. Accordingly, the server will comprise at least a memory and a processor, wherein execution of program instructions stored at the memory and executed on the processor cause the server to undertake certain steps and perform certain functions. The server further comprises at least one communications interface for receipt of a subscription and/or transmission of a publication. The server may include various other hardware and software features.

A number of flowcharts are included within the above-described figures, and referred to above in relation to the described methods. It will be understood that each block of the flowchart (and/or each step of the above described methods), and combinations of blocks in the flowchart (and/or combination of steps in the above described methods), may be implemented by various means, such as hardware, firmware, processor, circuitry, and/or other devices associated with execution of software including one or more computer program instructions.

For example, one or more of the procedures described above may be embodied by computer program instructions. In this regard, the computer program instructions which embody the procedures described above may be stored by a memory within the server or client device and executed by a processor at the same apparatus. Any such computer program instructions may be loaded onto a computer or other programmable apparatus (e.g., hardware) to produce a machine, such that the resulting computer or other programmable apparatus implements the functions specified in the flowchart blocks or steps of the above-described method. These computer program instructions may also be stored in a computer-readable memory that may direct or cause a computer or other programmable apparatus to function in a particular manner. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks and/or in the steps of the above-described method.

As discussed herein, a computer-readable storage medium or memory refers to a physical storage medium (e.g., volatile or non-volatile memory device) within a computing device.

Where the above described method states "at the client device" or "at the server", the skilled person will understand this may denote "at the client hosted at the client device" or "at the broker hosted at the server", respectively.

Although specific embodiments have now been described, the skilled person will appreciate that various modifications and alterations are possible. All of the features disclosed herein may be combined in any combination, except combinations where at least some of such features and/or steps are mutually exclusive. In particular, the preferred features of the invention are applicable to all aspects of the invention and may be used in any reasonable combination. Likewise, features described in non-essential combinations may be used separately (not in combination).

What is claimed is:

1. A client device for use in a cellular network providing location-based publications using a publish/subscribe protocol, comprising at least one processor and at least one memory storing program code instructions, wherein execution of the program code instructions at the processor cause the client device to:
   determine a geographical location of the client device;
   determine a first subscription geohash, the first subscription geohash identifying an area including the geographical location of the client device;
   send a subscription request to a server, the subscription request having a subscription name comprising the first subscription geohash;
   determine one or more additional subscription geohashes, representing a respective one or more geographical areas neighboring the geographical area represented by the first subscription geohash; and
   send one or more additional subscription requests to the server, each of the one or more additional subscription requests having a respective subscription name comprising a different one of the one or more additional subscription geohashes.

2. The client device of claim 1, wherein the first subscription geohash is a hierarchical data structure specified to a subscription level.

3. The client device of claim 2, wherein execution of the program code instructions at the processor further cause the client device to:
   determine a speed of the client device; and
   determine the subscription level based on the speed.

4. The client device of claim 2, wherein the client device being directed to determine the first subscription geohash further comprises the client device being directed to determine the first subscription geohash specified to the subscription level, and wherein the subscription name includes a predefined number of characters, wherein any characters of the predefined number of characters that are not filled by the first subscription geohash specified to the subscription level are filled with a wildcard character.

5. The client device of claim 1, wherein execution of the program code instructions at the processor further cause the client device to:
   send a request to the server to unsubscribe from the subscription having a subscription name comprising the first subscription geohash.

6. The client device of claim 1, wherein execution of the program code instructions at the processor further cause the client device to, prior to determining the one or more additional subscription geohashes:
   determine a direction of motion of the client device; and
   wherein the one or more geographical areas neighboring the geographical area represented by the first subscription geohash are one or more geographical areas based on the determined direction of motion of the client device.

7. The client device of claim 1, wherein execution of the program code instructions at the processor further cause the client device to after elapse of a time interval:
   determine a speed of the client device; or
   determine the time interval according to the speed.

8. A method for use in a cellular network providing location-based publications using a publish/subscribe protocol, the method comprising:
   determining, at a client device, a geographical location of the client device;
   determining, at the client device, a first subscription geohash, the first subscription geohash identifying an area including the geographical location of the client device, wherein determining, at the client device, the first subscription geohash comprises determining the first subscription geohash specified to a subscription level;

sending, from the client device, a subscription request to a server, the subscription request having a subscription name comprising the first subscription geohash;
determining, at the client device, a speed of travel of the client device; and
determining, at the client device, the subscription level based on the speed.

9. The method of claim 8, wherein the subscription name includes a predefined number of characters, and wherein any characters of the predefined number of characters that are not filled by the first subscription geohash specified to the subscription level are filled with a wildcard character.

10. The method of claim 8, further comprising:
determining a direction of motion of the client device;
determining, at the client device, one or more additional subscription geohashes, representing a respective one or more geographical areas in the direction of motion of the client device and/or neighboring the geographical area represented by the first subscription geohash; and
sending one or more additional subscription requests to the server, each of the one or more additional subscription requests having a respective subscription name comprising a different one of the one or more additional subscription geohashes.

11. The method of claim 8, further comprising:
receiving, at the server, the subscription from the client device, the subscription having the subscription name comprising the first subscription geohash;
receiving, at the server, a message for publication of a matching subscription, the message having a publication name comprising a publication geohash;
determining, at the server, if the subscription is a matching subscription; and
if the subscription is a matching subscription then sending the message to the client device;
wherein the first subscription geohash and the publication geohash are each hierarchical data structures specified to a respective level, and the subscription is a matching subscription when, at each level that both the publication geohash and first subscription geohash are specified, the publication geohash at a given level corresponds to the first subscription geohash at the same level.

12. A client device for use in a cellular network providing location-based publications using a publish/subscribe protocol, comprising at least one processor and at least one memory storing program code instructions, wherein execution of the program code instructions at the processor cause the client device to:
determine a geographical location of the client device;
determine a first subscription geohash, the first subscription geohash identifying an area including the geographical location of the client device, the first subscription geohash being a hierarchical data structure specified to a subscription level;
send a subscription request to a server, the subscription request having a subscription name comprising the first subscription geohash;
determine a speed of the client device; and
determine the subscription level based on the speed.

13. The client device of claim 12, wherein the client device being directed to determine the first subscription geohash further comprises the client device being directed to determine the first subscription geohash specified to the subscription level, and wherein the subscription name includes a predefined number of characters, wherein any characters of the predefined number of characters that are not filled by the first subscription geohash specified to the subscription level are filled with a wildcard character.

14. The client device of claim 12, wherein execution of the program code instructions at the processor further cause the client device to:
send a request to the server to unsubscribe from the subscription having a subscription name comprising the first subscription geohash.

15. The client device of claim 12, wherein execution of the program code instructions at the processor further cause the client device to, prior to determining the one or more additional subscription geohashes:
determine a direction of motion of the client device; and
wherein the one or more geographical areas neighboring the geographical area represented by the first subscription geohash are one or more geographical areas based on the determined direction of motion of the client device.

16. The client device of claim 12, wherein execution of the program code instructions at the processor further cause the client device to after elapse of a time interval:
determine a speed of the client device; or
determine the time interval according to the speed.

17. A method for use in a cellular network providing location-based publications using a publish/subscribe protocol, the method comprising:
determining, at a client device, a geographical location of the client device;
determining, at the client device, a first subscription geohash, the first subscription geohash identifying an area including the geographical location of the client device;
sending, from the client device, a subscription request to a server, the subscription request having a subscription name comprising the first subscription geohash;
determining a direction of motion of the client device;
determining, at the client device, one or more additional subscription geohashes, representing a respective one or more geographical areas neighboring the geographical area represented by the first subscription geohash; and
sending, from the client device, one or more additional subscription requests to the server, each of the one or more additional subscription requests having a respective subscription name comprising a different one of the one or more additional subscription geohashes.

18. The method of claim 17, further comprising:
receiving, at the server, the subscription from the client device, the subscription having the subscription name comprising the first subscription geohash;
receiving, at the server, a message for publication of a matching subscription, the message having a publication name comprising a publication geohash;
determining, at the server, if the subscription is a matching subscription; and
if the subscription is a matching subscription then sending the message to the client device;
wherein the first subscription geohash and the publication geohash are each hierarchical data structures specified to a respective level, and the subscription is a matching subscription when, at each level that both the publication geohash and first subscription geohash are specified, the publication geohash at a given level corresponds to the first subscription geohash at the same level.

* * * * *